United States Patent [19]
Adahan

[11] 3,811,526
[45] May 21, 1974

[54] RATE OF CHANGE OF VELOCITY CONTROL SYSTEM

[76] Inventor: Carmeli Adahan, 1930-Vine No. 303, Berkeley, Calif. 94709

[22] Filed: July 20, 1972

[21] Appl. No.: 273,679

[52] U.S. Cl. ........ 180/82 R, 180/105 E, 303/21 CF, 317/5
[51] Int. Cl. .......................................... B60k 33/00
[58] Field of Search ............... 180/77, 82 R, 105 E; 188/181 C; 303/21 CF, 21 B, 21 BE, 21 EB; 317/5

[56] References Cited
UNITED STATES PATENTS

| | | | |
|---|---|---|---|
| 3,661,428 | 5/1972 | Sharp | 303/21 CF |
| 3,245,213 | 4/1966 | Thompson et al. | 188/181 C UX |
| 3,546,530 | 12/1970 | Simonsen | 303/21 CF UX |
| 3,652,135 | 3/1972 | Baumann | 188/181 C X |

Primary Examiner—Robert B. Reeves
Assistant Examiner—Joseph J. Rolla
Attorney, Agent, or Firm—Hugh L. Fisher

[57] ABSTRACT

A skid control system for a wheeled vehicle having braking apparatus. By the system, wheel speed is monitored and converted to module input signals having a time spacing corresponding to the velocity of the wheel. These signals are used to control the charge and discharge of a velocity generator capacitor and a velocity reference generator capacitor. Between input signals a controller will cause the velocity generator capacitor to be charged from a certain threshold value to a peak value corresponding to the instantaneous velocity of the wheel and the velocity reference generator capacitor to be charged from the peak value of the velocity generator capacitor at a rate and to a voltage level corresponding to a desired deceleration rate. Upon the termination of input signal the controller will reset the velocity reference generator capacitor to the peak value of the velocity generator capacitor and the velocity generator capacitor to its threshold value. The voltage levels of the capacitors are compared by an operational amplifier and if the velocity reference generator capacitor has the lower voltage level, which indicates an impending wheel lock condition, an output is developed which through an output signal generator will operate the braking apparatus to relieve the braking force. The system is prevented from operating when the vehicle is stationary and also incorporates provisions for preventing response to minor velocity fluctuations and to wheel velocities below a certain minimum.

40 Claims, 6 Drawing Figures

RATE OF CHANGE OF VELOCITY CONTROL SYSTEM

Another embodiment of the control system is provided for reducing the throttle opening so as to prevent wheel spin during acceleration of the vehicle.

DISCLOSURE

This invention relates to improvements in velocity and rate of change of velocity controls adapted although not exclusively for controlling vehicle wheel skid during deceleration and vehicle wheel spin during acceleration.

The skilled vehicle driver when required to make an emergency stop particularly under adverse road conditions can lessen the possibility of an uncontrolled skid by pumping the brake pedal. This "seat of the pants" approach, of course, cannot very precisely sense deceleration rates so as to pump the brakes in such a way to achieve the optimum braking needed to decelerate without a skid. Hence, automatic antiskid controls have been provided for this purpose. These controls are usually either electronic or hydraulic and are both expensive and complicated. Furthermore, their performance is often based on comprises so that they are frequently either over responsive or under responsive. Then too, such controls are generally only suitable for skid control and cannot be used for preventing wheel spinning during acceleration.

With the foregoing in mind, a new and different electronic control system is contemplated that can provide control of both acceleration and deceleration.

Also contemplated is a rate of change of velocity control system that converts wheel velocity to input signals with a time spacing corresponding to the velocity of the wheel; that by a unique controller utilizes these input signals to control a velocity generator and a velocity reference generator which respectively develop signals corresponding to the instantaneous velocity of the wheel and to a desired rate of change of velocity; and that compares these latter signals, and if the desired rate of change of velocity is being exceeded, makes the appropriate control adjustment.

Further contemplated is a rate of change of velocity control system that is prevented from operating when the vehicle is stationary.

Also contemplated is a rate of change of velocity control system that includes novel provision for controlling the response of the system to predetermined conditions.

Another objective is to provide a rate of change of velocity control system with unique fail-safe provisions.

Other objects include the provision of a vehicle rate of change of velocity control system that is inoperative below a predetermined minimum wheel velocity so as to preclude operation at low vehicle speeds and the provision of a control system that is nonresponsive to certain velocity fluctuations.

The foregoing and other objects and advantages of the invention will become apparent from the following description and from the accompanying drawings in which.

Figure 1:
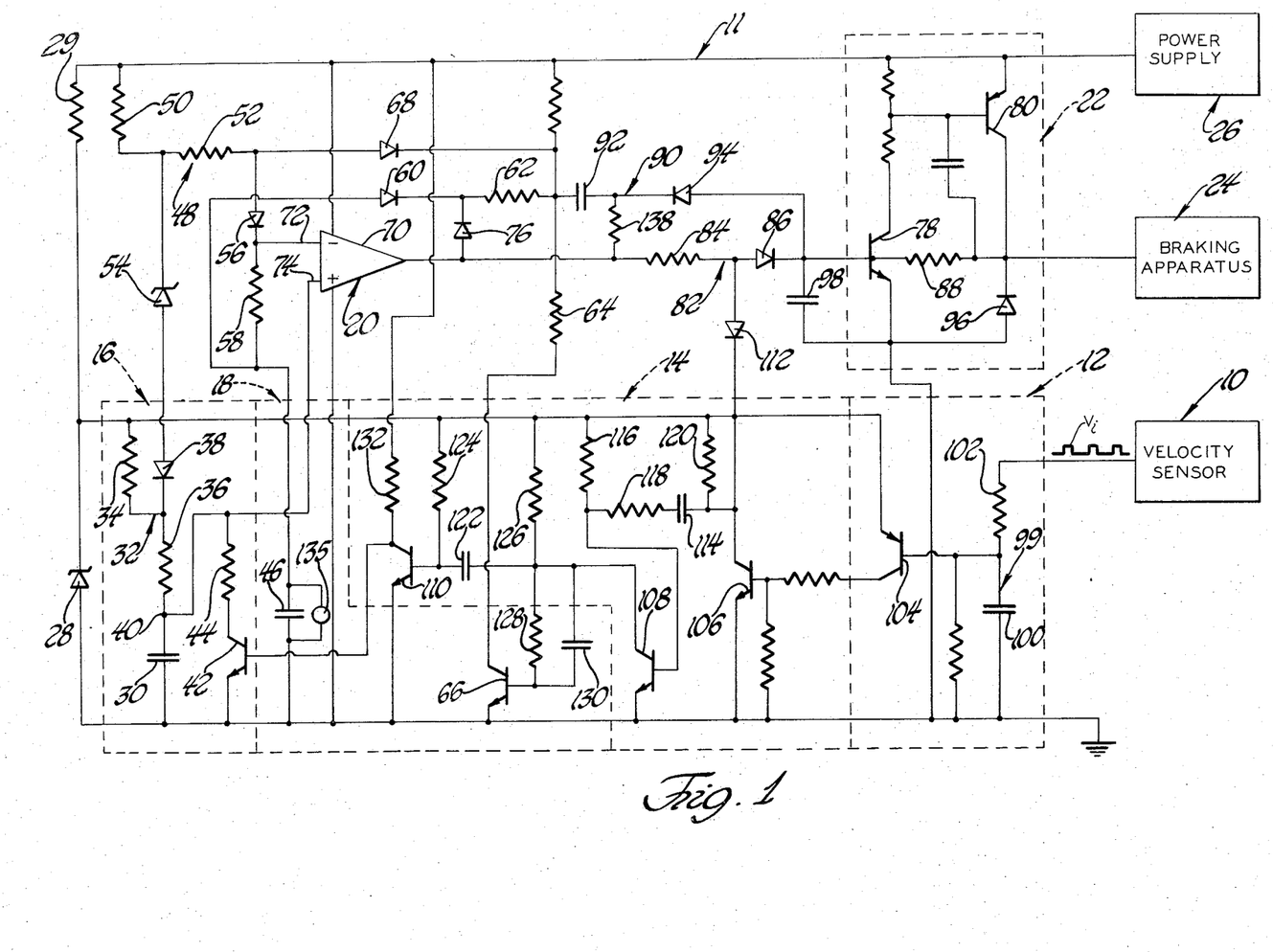
FIG. 1 is a schematic diagram of a skid control system incorporating the principles of the invention.

Referring first to FIG. 1, the system depicted has a velocity sensor 10 which senses the velocity of one of the vehicle wheels (not shown) and develops an output which is supplied as input signals Vi to a module shown generally at 11. These input signals Vi, which have a frequency directed related to the wheel velocity, are supplied to an input signal conditioner 12, which operates a controller 14. The controller 14 controls in a certain timed sequence or relationship the operation of a velocity generator 16 and a velocity reference generator 18, which respectively develop velocity and velocity reference signals V and VR. The velocity signals V have a peak voltage level each of which peaks represents the instantaneous velocity of the wheel and the velocity reference signals VR have a voltage representing a certain threshold rate of change of velocity of the wheel. A comparator 20 compares the voltages of the velocity and velocity reference signals V and VR, and if the velocity signal voltage exceeds that of the velocity reference signal VR, an output signal generator 22 is rendered operative by the comparator 20 to operate a vehicle control, which in FIG. 1 is a braking apparatus 24. The braking apparatus 24 can be of any well known type, for example, the type that provides a braking pressure for braking the wheels of the vehicle. Hence, the output signal generator 22 functions to cause the braking apparatus 24 to reduce this braking pressure since the mentioned condition of the velocity signal voltage level exceeding that of the velocity reference signal VR indicates an approaching or impending wheel lock condition which the system avoids.

The velocity sensor 10 can be of any well known type that responds to the rotation of the wheel and develops an output signal with a rectangular shape wave form. By way of example, an electro-magnetic pickup can be employed along with a pulse shaper, such as a squaring circuit to provide the input signals Vi shown in FIG. 2 having a rectangular wave form and a time spacing corresponding to the velocity of the wheel. Consequently, the sensor 10 will, at low speeds of the wheel, develop input signals Vi with a time spacing, such as at time $t4$, that is greater than when the wheel velocity is relatively fast; e.g., at time $t2$.

The FIG. 1 system is provided with power by a power source denoted at 26 which could be a vehicle battery. This power is adjusted to fixed reference voltage level for operating the velocity and velocity reference generators 16 and 18 by a Zener diode 28 which provides voltage regulation in a well known way. A resistor 29 limits the current through the Zener diode 28 so as to limit the current. It should be kept in mind that the different transistors shown in the FIG. 1 system are for exemplary purposes only of the indicated conductivity type.

Considering first the velocity generator 16, as illustrated the velocity generator 16 comprises a velocity capacitor 30 which develops the velocity signal V. The peak voltage level of the velocity signal V during each charge and discharge cycle directly corresponds to wheel velocity changes from one cycle to another. To do this the charging curve viewed in FIG. 3 and shown at 31 is developed so as to simulate a hyperbola. This is because a hyperbola can be defined by the equation:

$$V = k/t,$$

where:

$V$ is velocity, $k$ a constant and $t$ the elapsed time. Therefore, the capacitor peak voltage changes are directly related to velocity changes. Also as the hyperbola approaches its peak value at low speeds, there is only a slight change in the peak voltage per wheel speed change which, as will be discussed, combines with providing a hystersis feature to render the system relatively non-responsive to slight voltage changes along this portion of the hyperbola and correspondingly to rate of change of velocities when the wheel velocity is, by way of example, below 2 or 3 miles per hour. To simulate the hyperbola, a resistor diode network 32 is provided which comprises resistors 34 and 36 and a diode 38 in parallel with the resistor 34. Thus, the velocity capacitor 30 is charged by the power supply 26 through this resistor diode network 32 so that the voltage at a junction 40 will, during the charging, increase from a predetermined threshold value which in this embodiment is ground or close to ground, along the hyperbolic curve 31 in FIG. 3 to a peak value at point 41. The discharge of the velocity capacitor 30 is by way of a discharge switch, such as a switching transistor 42, which when turned on connects the junction 40 to the low potential or ground side of the power supply 26. Hence, the velocity capacitor 30 discharges therethrough by way of a resistor 44 which controls rate of discharge so as to not damage the switching transistor 42. Accordingly, the discharge will be along the curve portion 45 in FIG. 3.

The velocity reference generator 18 includes a velocity reference capacitor 46 which functions as a memory since during the non-skid condition it is always reset to the peak voltage level of the velocity generator capacitor 30. Thus, the velocity reference generator 18 remembers what the instantaneous velocity of the wheel was just prior to the discharge of the velocity generator capacitor 30. Also, the velocity reference generator 18 provides the velocity reference signal VR, which as explained, corresponds to a certain threshold deceleration rate. This threshold deceleration rate is that which if exceeded, will result in a wheel lock and therefore the braking force is relieved to prevent this wheel lock. As observed, in FIG. 3 the signal VR has a ramp or curve portion 47 with fixed slope representing this deceleration. To charge the velocity reference generator capacitor 46 at this rate, a rate of velocity change generator, which in the FIG. 1 system is a deceleration generator designated generally at 48, is employed. The deceleration generator 48 can, as those versed in the art will appreciate, be in many different forms. As illustrative only, a pair of resistors 50 and 52 which are connected to the power supply 26 as viewed in FIG. 1, and a Zener diode 54, which functions as a voltage regulator, combine to provide a relatively constant current for charging the velocity reference generator capacitor 46 at the required rate. If the power supply 26 voltage is not adequate to avoid this voltage reduction, either a diode pump or a separate voltage source adapted to provide the desired charge rate could be used. The velocity reference generator capacitor 46 is charged by the deceleration generator 48 through a blocking diode 56 and an inhibitor or voltage dropping resistor 58 which, in effect, offsets the voltage of the velocity reference signal VR by a predetermined magnitude $\Delta V$ (FIG. 3); i.e., the ramp or curve portion 47 is offset the $\Delta V$ amount. This $\Delta V$ amount corresponds to a fixed small velocity to which the system will not respond and contributes to the aforementioned hystersis feature. The velocity reference generator capacitor 46 is discharged through a diode 60, a discharge resistor 62, which controls the rate of discharge along a curve portion 63 in FIG. 3, and a current limiting resistor 64 by a discharge switch, such as a switching transistor 66. This discharge resistor 62 as also will be discussed more in detail functions to restrict the response of the FIG. 1 system so as to preclude response to rapid fluctuations of the wheel velocity such as occur along a rough road.

It should be noted that when the switching transistor 66 is on, substantially all of the current from the deceleration generator 48 is diverted by way of a diode 68 through the switching transistor 66 to ground to prevent current from flowing through the inhibitor resistor 58 so that the comparator no longer senses the $\Delta V$ amount.

The comparator 20 is continuously operative to compare the voltage levels of the velocity generator capacitor 30 and the velocity reference generator capacitor 46. Different types of voltage level comparators can be utilized, but in this FIG. 1 system, the comparator 20 is preferably an operational amplifier 70 having an inverting input 72 coupled to the velocity reference generator 18 and an non-inverting input 74 coupled to the velocity generator 16. The operational amplifier 70 may be of the commercially available 741 type and functions in the FIG. 1 system as a differential amplifier and as such compares the voltage at its inputs 72 and 74 and then amplifies the difference. In operation the operational amplifier 70 endeavors continuously to either raise or lower the voltage at the inverting input 72 to match the voltage at the non-inverting input 74, which serves as a reference and develops a corresponding output. Therefore, when a non-wheel lock condition exists and the velocity reference generator capacitor 46 is being discharged to level of the velocity generator capacitor 30, which occurs at the point 41 in FIG. 3, the operational amplifier 70 will develop a positive output as the velocity reference generator capacitor 46 attempts to discharge past this point 41. This output is supplied through a diode 76 to the cathode of the diode 60 in the discharge path of the velocity reference generator capacitor 46 so as to block further discharge. If a wheel lock condition is impending, the velocity generator capacitor 30 will develop a voltage that is greater than that of the velocity reference generator capacitor 46 plus the $\Delta V$ amount and the operational amplifier 70 will again develop a positive output for activating the output signal generator 22. This aspect of the operation will be further described in the summary of the operation of the FIG. 1 system.

The output signal generator 22 which functions to operate the braking apparatus 24 so as to relieve the braking force comprises a control transistor 78 and a supply transistor 80. When the comparator 20 develops the mentioned positive output indicating that a wheel lock condition is impending, the control transistor 78 will through a turn on network 82 comprising a resistor 84 and a diode 86 be biased on. The conductive control transistor 78 then will forward bias the supply transistor 80 and the conductive supply transistor 80 then connects the power supply 26 directly to the braking apparatus 24 so as to reduce the braking force and thereby avoid the wheel lock. The control transistor 78 is maintained on once conductive by a resistor 88. This condition will continue until a turn off network 90 comprising a capacitor 92 and a diode 94 becomes effective in a way to be explained to lower the bias on the control transistor until turn off occurs. The output signal generator 22 also includes a diode 96 which functions to prevent any inductance generated reverse voltage from damaging the control and supply transistor 78 and 80 at turn off. This reverse voltage would result if the usual solenoid winding is employed by the braking apparatus 24. A filtering capacitor 98 is coupled to the input to the control transistor 78 to remove transients so that they do not affect the operation of the control transistor 78. The capacitor 98 is also in series with the capacitor 92 and combines therewith to provide a more positive turn off of the control transistor 78 by extending or continuing the negative bias.

The input signal conditioner 12 provides filtering and also establishes a threshold level for operating the controller 14. The filtering is provided by a filter 99 comprising a capacitor 100 and a resistor 102 in the input circuit to a transistor 104. The transistor 104 has the filtered input signal Vi applied to its base and will turn on when the input signal Vi goes negative. When conductive, the transistor 104 will initiate one phase of the operation of the controller and when nonconductive another phase.

The controller 14 serves several functions. To carry out these functions the controller 14 employs series connected transistors 106, 108 and 110. The transistor 106 has its base connected to the collector of the input signal conditioner transistor 104, its emitter connected to ground and its collector connected both to an operation preventing or shunt diode 112, which shunts the comparator output to ground when the transistor 106 is conductive, and to one side of a timing capacitor 114. The other side of the timing capacitor 114 is connected to the base of the transistor 108. Resistors 116, 118 and 120 are also connected, as shown in FIG. 1, to the opposite sides of the timing capacitor 114. The transistor 108 has its emitter connected to ground and its collector connected to one side of another timing capacitor 122. The other side of the timing capacitor 122 is coupled to the base of the transistor 110. Resistors 124 and 126 are connected between the opposite sides of this timing capacitor 122 and the power supply 26. The collector of the transistor 108 is coupled to the base of the switching transistor 66 through a resistor 128 which has in parallel with it a capacitor 130. The capacitor 130 as it discharges facilitates a faster turn off of the transistor 66. The transistor 110 has its emitter connected to the ground and its collector connected both to the base of the switching transistor 42 for the velocity generator 16 and through a resistor 132 to the power supply 26.

In operation when the input signal Vi is going positive, the input signal conditioner 12 will be off; i.e., its transistor 104 will be nonconductive. With the transistor 106 nonconductive the timing capacitor 114 will not have its one side connected to the ground and thus will charge. The base of the transistor 108 will become more positive during this charge; hence it will remain conductive. Consequently, the transistor 110 will be maintained conductive. With both of the transistors 110 and 108 conductive, the switching transistors 42 and 66 will be maintained nonconductive. Subsequently, when the input signal Vi from the velocity sensor 10 goes off or negative, the input signal conditioner transistor 104 will turn on and in turn render the controller transistor 106 conductive to again connect the timing capacitor 114 to ground. When this happens, the resultant reduced charge will cause the voltage on the base of the transistor 108 to reduce until the transistor 108 turns off. Now, the timing capacitor 122 will start to charge in the same way as the timing capacitor 114. The resultant increased positive bias on the transistor 110 will not alter its conductive status and the switching transistor 42 will be maintained off. However when the transistor 108 is turned off, a positive potential is applied to the base of the switching transistor 66 and it will become conductive so as to initiate the discharge of the velocity reference generator capacitor 46. In the meantime, the timing capacitor 114 will again charge, and after a predetermined time interval apply a positive bias to the base of the transistor 108 which will turn it on. The conductive transistor 108 will connect the timing capacitor 122 to ground and cause the transistor 110 to be turned off because of the resultant negative bias. The base of the switching transistor 42 will then have a positive bias imposed thereon and will be turned on to commence the discharge of the velocity capacitor 30. Also, when the transistor 108 is turned on again the switching transistor 66 will be turned off. Then in the same way as the timing capacitor 114, the timing capacitor 122 will be recharged through the resistor 124 until after the elapse of a predetermined time interval when the transistor 110 will be biased on so as to turn off the switching transistor 42.

To preclude the operation of the system, when the vehicle is stationary, the output of the comparator 20 is shunted to ground. At this time the input signal Vi will be off or at its threshold level and therefore the input signal conditioner transistor 104 will be biased on so as to turn on the controller transistor 106. Consequently, the output of the comparator 20 will be connected through the inhibitor diode 112 and the transistor 106 directly to ground so as to preclude operation of the output signal generator 22 and accordingly the braking apparatus 24.

Describing now the operation of the FIG. 1 system, it will first be assumed that the vehicle is stationary. With the vehicle stationary the sensor input will be at the threshold level of the input signal Vi and can be considered off. Hence, the input signal conditioner 12 will be operative in the just described way to render the controlled transistor 106 conductive so as to connect the output from the comparator 20 by way of the inhibitor diode 112 to ground and prevent operation of the output signal generator 22.

Figure 2:
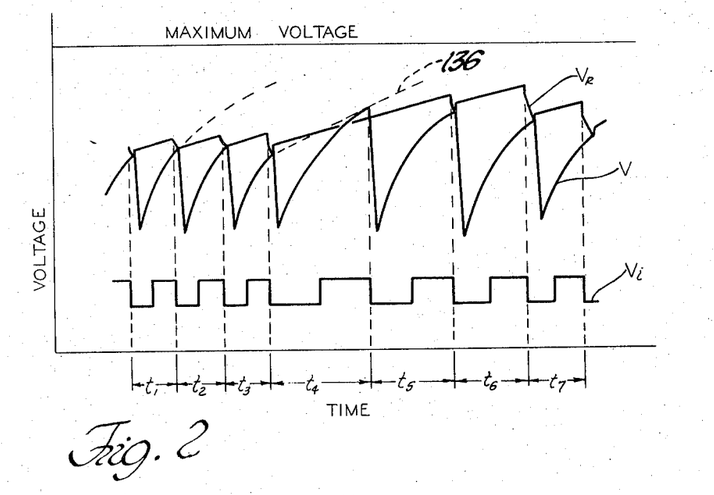
FIG. 2 is a time-voltage graph depicting the signals developed by FIG. 1 during different modes of operation.
Figure 3:
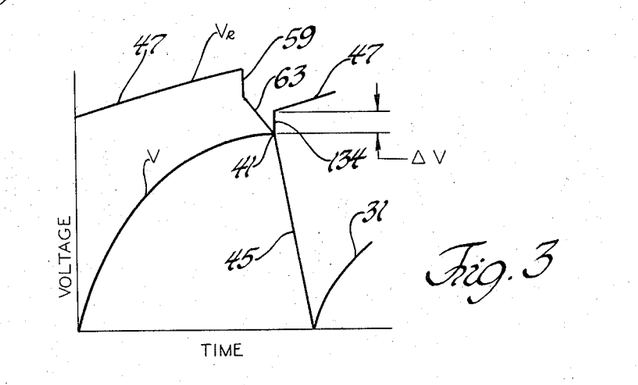
FIG. 3 is an enlarged view of a portion of the FIG. 2 graph showing the voltages sensed by a voltage comparator.

Next assuming that the vehicle is moving at a relatively constant speed with the brakes released and keeping in mind that the velocity and velocity reference signals V and VR viewed in the FIGS. 2 and 3 graphs represent the voltages sensed by the operational amplifier 70, the input signals Vi will be generated with a constant time spacing as shown in FIG. 2 at the times t1, t2 and t3. Considering the time t1, and with reference to FIG. 3, just prior to the increase of the input signal Vi from its threshold level, the velocity generator capacitor 30 will be charging along the curve portion 31, whereas the velocity reference generator capacitor 46 will be charging along the curve portion 47. Because of the resistor diode network 32 in the charging path, the charging curve portion 1 of the velocity generator capacitor 30 will, as explained, be in the form of a hyperbola. When the input signal Vi increases, the input signal conditioner transistor 104 will turn off and in turn cause the controller transistor 106 to turn off. The timing capacitor 114 will be charged through the resistors 116, 118 and 120 and the transistors 108 and 110 will continue to be conductive. Consequently, the switching transistors 42 and 66 will be off.

When the input signal Vi commences to decrease or go negative, the input signal conditioner transistor 104 will turn on as will the controller input transistor 106. As a consequence, the timing capacitor 114 will discharge and the controller 14 will first turn on the switching transistor 66 to commence the discharge of the velocity reference generator capacitor 46 through the diode 60 and the resistors 62 and 64 to ground. The deceleration generator 48 will also have its output connected to ground through the diode 68 so as to eliminate the voltage drop by the voltage dropping resistor 58. As discussed, because of the voltage dropping resistor 58, the voltage sensed by the comparator's operational amplifier 70 at input 72 prior to discharge will by the amount ΔV or the voltage dropped by the voltage dropping resistor 58, have been greater than the voltage level of the velocity reference generator capacitor 46, but now the input 72 will sense the actual voltage of the capacitor 46 which is less. Consequently, at the input 72 there will be an initial voltage drop at discharge as shown in FIG. 3 by the curve portion 59. Upon further discharge of the capacitor 46 the reduction of the voltage will be controlled by the resistor 62 and the discharge will be along the curve portion 63 until the voltage reaches the level of the velocity generator capacitor 30 at the point 41.

At the point 41 the operational amplifier 70 will develop a positive output since, as discussed, the output of the operational amplifier 70 will function to try to bring the voltage of the velocity reference generator capacitor 46 sensed at input 72 up to the level of the velocity generator capacitor 30 sensed at input 74. Therefore, at the point 41, a positive output will be developed and by way of the blocking diode 76 will be applied to the cathode of the diode 60 to prevent further discharge of the velocity reference generator capacitor 46. Also at this time, the conductive controller transistor 106 will by way of the shunt diode 112 divert the positive output to ground so as to preclude operation of the output signal generator 22. The controller timing capacitor 114 will after a timed interval charge enough to turn on the transistor 108 so as to turn off the velocity reference generator switching transistor 66 to interrupt the ground connection and commence discharge of the timing capacitor 122. This will turn off the transistor 110 and turn on the velocity generator switching transistor 42. The velocity generator capacitor 30 will then discharge to ground through the resistor 44 along the curve portion 45 in FIG. 3. At the same time, the voltage reference generator capacitor 46 will start to recharge and the voltage at the inverting input 72 to the operational amplifier 70 will immediately increase along a curve portion 134 seen in FIG. 3. This is because the deceleration generator 48 will again start to charge the velocity reference generator 46 through the voltage dropping resistor 58, and therefore, the inverting input 72 to the operational amplifier 70 will now see an increased voltage; i.e., a voltage greater than the voltage of the velocity reference generator capacitor 46 by the amount of the voltage drop across the voltage dropping resistor 58. For illustration purposes only, ΔV amount of the curve portion 134 represents a voltage equal to approximately 2 miles per hour. Consequently, the velocity of the wheel; e.g., during the time t3 will have to exceed the past instantaneous velocity at time 2 by 2 miles per hour and also the curve portion 47 of the velocity reference signal VR before the FIG. 1 system will be operative to respond to a wheel lock condition; i.e., the instantaneous velocity of the wheel at the point 41 will have to be this 2 miles per hour greater value. This feature assures system inactivity when the car approaches a stop and also insures that the system does not respond to minor speed fluctuations.

The curve portion 63 established by the discharge resistor 62 also limits response of this system to wheel acceleration. This is because the velocity reference generator capacitor 46 follows the wheel velocity and the discharge resistor 62 limits the system's acceleration following ability to the maximum acceleration expected, which without limitation is approximately 1 g. Hence the system will not respond to momentary wheel accelerations beyond this rate, such as those due to vehicle suspension resonance; thus eliminating response to momentary decelerations that follow.

Finally, to complete the non-wheel lock cycle of operation, the controller timing capacitor 122 will after a timed interval charge back to the turn on level of the transistor 110 and turn off the switching transistor 42 so as to interrupt the ground connection. This will allow the velocity generator capacitor 30 to again start to charge along the curve portion 31. Assuming either that the constant wheel speed continues or that the wheel speed is such that an impending wheel lock is not sensed, this non-wheel lock operation will continue without the output signal generator 22 being turned on.

If wanted, the instantaneous velocity and the actual rate of change of the velocity of the wheel can be obtained as shown in FIG. 2 by monitoring with well known voltage sensors the velocity and velocity reference signals V and VR as sensed by the operational amplifier. For example, with a constant speed at the times t1, t2 and t3, the velocity and velocity reference signals V and VR will appear as illustrated in FIG. 2 with the peak value of the velocity signals V at each of the times t1, t2 and t3 being the same or equal to indicate that the instantaneous velocity of the wheel is constant with a zero rate of change of velocity. To determine the actual value of the instantaneous velocity assume that the vehicle is stationary, then the sensor 10 will provide a constant input at the threshold level of the input signal Vi and the voltage of the velocity generator capacitor 30 will increase asymptotically along the broken line to its maximum value at the line designated "maximum voltage" which indicates zero speed. Therefore, the difference between the peak value of each of the velocity signals V and the maximum voltage represents the instantaneous velocity of the wheel. Furthermore, the difference between the peak values of the velocity signals V at each successive time interval indicate the rate of change of the velocity.

It should be noted that by connecting a voltmeter 135 across the velocity reference generator capacitor 46 and by appropriately calibrating it, the voltmeter 135 can perform as a tachometer and provide the R.P.M. of the wheel whose speed is being sensed by the sensor 10. By further calibration; i.e., by consideration of the ratio between engine speed and wheel speed, engine R.P.M. could be provided by the voltmeter 135.

Continuing to refer to FIG. 2, each of the velocity signals V as they occur will not indicate an impending wheel lock condition as long as the actual rate of change of the velocity, in this case the deceleration rate, does not exceed the chosen rate established by the velocity reference signals VR. This chosen or desired deceleration rate is selected to avoid wheel lock, and thus, is indicative of an impending wheel lock unless the deceleration rate is immediately corrected. For this reason at each input signal Vi, the velocity reference generator 18 is reset to the instantaneous velocity of the wheel at that time and then recharges along the desired deceleration rate curve 47 in FIG. 3. This renders the FIG. 1 system instantly responsive, within each time interval, to an impending wheel lock condition, as distinguished from the systems that sense averages, so that correction in the actual deceleration rate can be immediately made. An example of the relationship of the velocity and velocity reference signals, when a wheel lock condition is approaching, is illustrated in FIG. 2 at the time interval $t4$. As can be observed, the velocity signal curve portion 31 has exceeded the velocity reference signal curve portion 47 indicating that the skid condition is approaching because the braking is causing the wheel to decelerate too rapidly. This excessive deceleration rate is shown by the broken line at 136 which connects the peak values of the velocity signal V at the successive time intervals $t3$ and $t4$. As can be observed the slope of the broken line 136, which corresponds to the actual deceleration rate is substantially greater than the slope of the velocity reference signal curve portion 47, which represents the threshold deceleration rate.

Assuming that the impending wheel lock condition at the time interval $t4$ in FIG. 2 is occurring, the velocity of the wheel will reduce and the time interval $t4$ will correspondingly be greater than; e.g., the time interval $t3$. Consequently, the velocity generator capacitor 30 will be permitted to charge longer and develop a greater voltage than the velocity reference generator capacitor 46. The comparator 20 will sense this and develop a positive output because as explained the operational amplifier 70 will try to bring the voltage of the velocity reference generator capacitor 46 up to the level of the velocity generator capacitor 30 as though they were coupled together. This positive output will be applied through the turn on network 82 to the base of the output signal generator control transistor 78 and turn it on. The support transistor 80 will then be turned on and a control signal applied to the braking apparatus 24 to relieve the braking force. It should be noted that whenever a wheel lock condition occurs, it will be near the end of the time interval $t4$. Consequently, the input signal Vi will be positive and through the input signal conditioner 12 turn off the controller transistor 106 to prevent shunting the positive output by way of the shunting diode 112 to ground. When the controller transistor 106 is turned off and then on as the input signal Vi goes from positive to negative, the controller 14 functions as described before to first turn on the velocity reference generator switching transistor 66, and subsequently, the velocity generator switching transistor 42. However, the velocity reference generator capacitor 46 is prevented from discharging because the positive output from the operational amplifier 70 is applied through blocking diode 76 to the cathode of the diode 60 to prevent discharge therethrough. Also the same positive output is applied to the turn off network 90 through a resistor 138 which prevents the capacitor 92 from applying a negative voltage to the base of the output signal generator control transistor 78 so to turn it off when the capacitor 92 is discharging to ground through switching transistor 66. Subsequently, the velocity generator capacitor 30 will be discharged to ground through the resistor 44. When the controller transistor 106 turns back on, the positive output of operational amplifier will again be shunted to ground. However, the output signal generator control transistor 78 will, because of the resistor 88, continue to be conductive until a negative bias is applied to its base. With the switching transistor 66 off, the turn off network capacitor 92 and the capacitor 98 in series therewith will both be recharged and therefore, will not provide this negative bias for turn off until again discharged through the conductive switching transistor 66.

If the wheel lock condition persists, the subsequent operation will be as previously discussed. If the wheel lock condition is overcome, the velocity and velocity reference signals V and VR will be as shown during the time interval t5 in FIG. 2 because the velocity of the wheel will have increased due to the reduction of the braking force. Then the occurrence of the input signal Vi from the velocity sensor 10 will as before cause the controller 14 to turn on the switching transistor 66 so as to discharge the velocity reference generator capacitor 46. With the operational amplifier output reduced, the turn off network capacitor 92 will discharge through the switching transistor 66, and therefore, apply the negative bias on the base of the output signal generator control transistor 78 for turning it off and accordingly the supply transistor 80 off so that power will no longer be applied to the braking apparatus 24. Similarly, if the wheel lock condition is eliminated before the switching transistor 66 is turned on, the reduced output from the operational amplifier 70 will cause the voltage at the junction between the resistor 138 and the capacitor 92 to reduce and this will provide the negative bias for turning off the transistor 78. The controller 14 will next turn on the switching transistor 42 so as to discharge the velocity reference generator capacitor 46.

Figure 5:
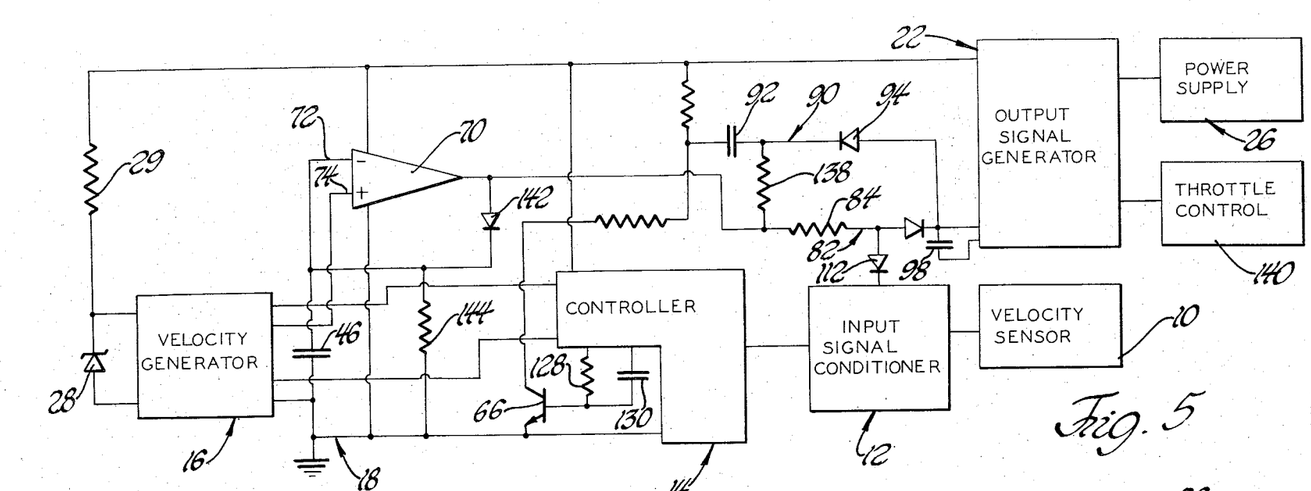
FIG. 5 is a schematic diagram of a spin control system.

Referring to FIG. 5, the system depicted is for preventing wheel spinning during vehicle acceleration and except as will be discussed is the same as the FIG. 1 system. Therefore, the same numerals are used to designate like parts and numbers with a prime (') used to denote similar parts. Instead of the braking apparatus 24, a vehicle control in the form of a throttle control 140 is provided for in any appropriate way reducing the throttle opening; e.g., a motor can be used to actuate the usual throttle linkage so as to reduce the power developed by the vehicle engine and thus preclude the wheel spinning condition prior to its actually happening. Accordingly, the output signal generator 22 in this FIG. 5 embodiment has the supply transistor 80 and the control transistor 78 both biased so as to be normally conductive and thus provide for maintaining the throttle control 140 inoperative until a spin condition is impending. Then the output is reduced to allow the throttle control 140 to become operative.

Also different is the velocity reference generator which is denoted by the numeral 18 and the provision for charging and discharging the velocity reference generator capacitor 46. In this FIG. 5 embodiment, the capacitor 46 is charged by the output of the comparator's operational amplifier 70 through a one way conducting device, such as a diode 142. The capacitor 46 discharges through a resistor 144 which serves as an accelerator generator and establishes the rate of discharge. This rate of discharge corresponds to the threshold acceleration rate which if exceeded would result in an undesired wheel spin condition. This threshold acceleration rate is shown in FIG. 4 where the signal VR has a ramp or curve portion 146 with a fixed slope representing acceleration.

Figure 4:
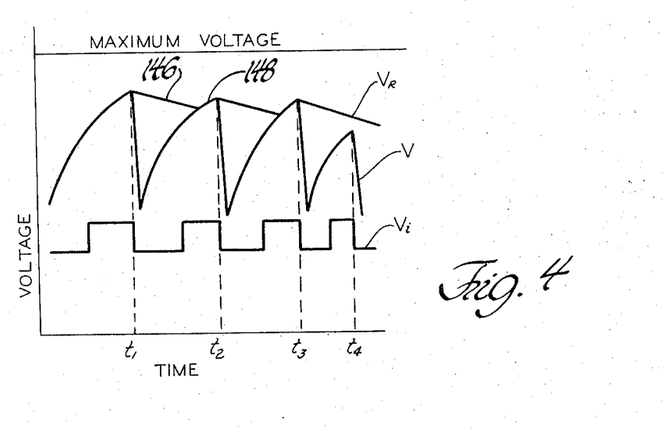
FIG. 4 is a time-voltage graph depicting the signals developed by the FIG. 5 system during difference modes of operation.

With reference to FIG. 4, the velocity generator 16 will perform as previously described and develop the depicted velocity signals V at times $t1, t2, 3$ and $t4$. Since, as explained, the peak values of the velocity signals V at times $t1, t2, t3$ and $t4$ each have a successively increasing distance from the "maximum voltage" or zero speed line, it is known that the wheel speed is increasing. Therefore, because each peak value represents the instantaneous velocity of the wheel, the difference between the peak values at each successive time interval corresponds to the actual acceleration. Hence, the slope of a line through two successive peaks of the velocity signals V must not exceed that of the ramp 146 of the velocity reference signal VR or else an impending spin condition will be sensed as at time $t4$.

Considering again FIG. 5 while continuing to refer to FIG. 4, it will be assumed that the system is operating in the non-spin mode between the times $t1$ and $t2$. During this time, the velocity generator capacitor 30 will charge, whereas the velocity reference generator capacitor 46 will be discharging through the resistor 144. The capacitor 46 will discharge because the comparator's operational amplifier 70 is adjusted so that a positive output is developed only when the voltage of a velocity reference generator capacitor 46 attempts to go below the voltage of the velocity generator capacitor 30. Until this occurs, there will be a null output from the operational amplifier 70. Furthermore, discharge is only through the resistor 144 for, as mentioned, the diode 142 prevents the velocity generator capacitor 46 from discharging to this zero potential. Therefore, the velocity reference capacitor 46 will discharge until its voltage reduces to the voltage of the velocity generator capacitor 30, then the operational amplifier 70 will sense this condition and commence to develop a positive output which will be supplied to the reference generator capacitor 46 and commence to recharge it along curve portion 148. The curve portion 148 will, as shown, coincide with the curve portion 31 of the velocity signal V (FIG. 3).

In the meantime, this same positive output will be supplied through the turn on network 82 to the output signal generator 22, but because the control transistor 78 and the supply transistor 80 are conductive, the positive output will not change the conduction by the control transistor 78. This positive output is also applied across the resistor 138 which is connected to the turn off network 90. Then when the input signal Vi goes negative, the input signal conditioner 12 will by means of the controller transistor 106, which becomes conductive, cause first the velocity reference generator switching transistor 66 to be turned on and then subsequently the velocity generator switching transistor 42. The switching transistor 66 will connect the turn off network capacitor 92 to ground, whereupon it will discharge. However, the other terminal of the capacitor 92 due to the positive potential applied to the resistor 138 will not be permitted to go negative so as to through the diode 94 apply a negative turn off bias to the control transistor 78. Therefore, the status of the output signal generator 22 will, as long as there is no impending spin, continue as before, It will be noted that the switching transistor 66 does not in the FIG. 5 embodiment cause a discharge of the velocity reference generator capacitor 46. When the switching transistor 42 is turned on by the controller 14, the velocity generator capacitor 30 dischages and as soon as the level of the velocity generator capacitor 30 is below that of the velocity reference generator capacitor 46, the output of the comparator's operational amplifier 70 will be again nulled. As described before, the controller 14 will turn off the switching transistor 66 and then the switching transistor 42 for the velocity generator 66 so as to stop the discharge of the velocity generator capacitor 30. This cycle repeats itself as long as there is no impending spin condition.

When the spin condition occurs, such as shown between the times $t3$ and $t4$ in FIG. 4, the level of the velocity signal V will not reach that of the velocity reference signal VR. Consequently, the comparator's operational amplifier 70 will continue to have a zero output which will not alter the status of the output signal generator 22. However, when the input signal Vi commences to go negative, the input signal conditioner 12 will cause the controller transistor 106 to be turned on and commence the operation of the controller 14 with the switching transistor 66 being first turned on. With the switching transistor 66 on, the capacitor 92 for the turn off network 90 will discharge to ground, and because of the zero output from the operational amplifier 70 there will be no positive potential applied to the resistor 138. Hence, the capacitor 92 will apply a negative potential through the diode 94 to the output signal generator control transistor 78. This negative potential will turn off the control transistor 78, which will in turn turn off the supply transistor 80. The output to the throttle control 140 will then be terminated so that it can actuate the throttle to reduce its opening and thus, reduce the acceleration of the vehicle wheels. The controller 14 will as described before, next turn off the switching transistor 66 and turn on the switching transistor 42 for the velocity generator 16 so tht the velocity generator capacitor 30 is discharged. This cycle of operation will continue until the spin condition is alleviated and the voltage of the velocity signal V again builds up so as to again intersect the ramp or curve portion 146 and render the comparator's operational amplifier 70 operative to develop the positive output. When this positive output is again developed, it will be applied through the turn on network 82 and cause the operational output signal generator 22 to return to its normal operation with the control transistor 78 and the supply transistor 80, both being conductive again so as to operate the throttle control 138 and remove the restraint on the throttle.

Figure 6:
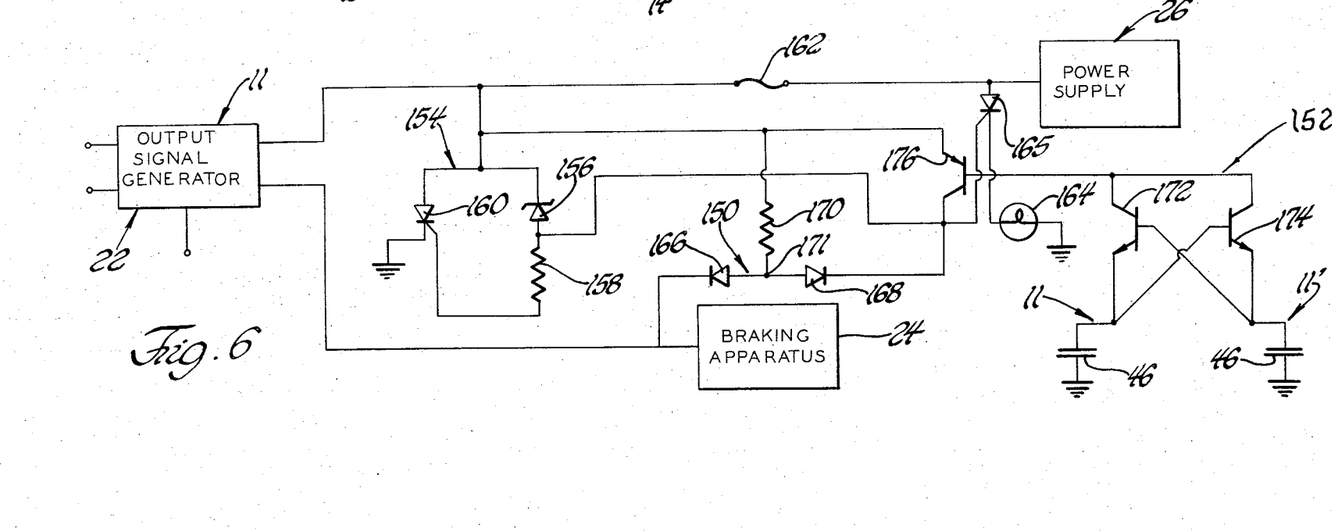
FIG. 6 is a schematic diagram of a circuitry for providing a warning in the event of a system failure.

Referring next to FIG. 6 there are shown various provisions for both turning off the system and providing warning that the system is malfunctioning. These include a vehicle control malfunction detector 150, a module malfunction detector 152 and a power supply malfunction detector 154.

The power supply malfunction detector 154 is connected to the output of the power supply 26 for either the FIG. 1 or 5 system and includes voltage regulation device, such as a Zener diode 156, a resistor 158, and a switching device such as an SCR 160. A conventional fuse 162 is shown at the output of the power supply 26; however, conventional fuses do not generally rupture quick enough to prevent the excessive voltage from damaging the various transistors. The power supply malfunction detector 154 overcomes this problem because the excessive voltage will render the Zener diode 156 conductive and in turn will apply a turn on potential to the gate of the SCR 160. This SCR 160 will conduct and divert the excessive current to ground. Subsequently, the fuse 162 will rupture, but in the meantime excess voltage protection has been provided. The power supply malfunction detector 154 is connected to a warning device, such as lamp 164 which can be mounted; e.g., on the vehicle dash board so as to be easily viewed by the vehicle operator. This warning lamp 164 will be illuminated when the Zener diode 156 breaks down and starts to conduct. When this happens, a turn on potential will be supplied to another SCR 165 which will then couple the warning lamp 164 to the output of the power supply 26 so that the vehicle operator will receive continuous warning. Other types visual as well as audio warning devices could be employed if preferred.

The vehicle control malfunction detector 150 combines with whatever the vehicle control is; for example, in FIG. 5 it would be combined with the throttle control 140 and in the FIG. 1 system with the braking apparatus 24. If it is assumed that as shown in FIG. 6, it is associated with the braking apparatus 24, then a malfunction in the braking apparatus; for instance, a ruptured solenoid winding will be sensed by the detector 150. as shown, the detector 150 includes a pair of diodes 166 and 168 arranged with their anodes connected together and through a resistor 170 of a very high resistance to the power supply 26. The diode 166 has its cathode connected to the input of the braking apparatus 24, whereas the diode 168 has its cathode connected to the SCR 165. The diode 166 blocks the flow of the current supplied by the output signal generator 22 to the braking apparatus 24 from the detector 150. The diode 168 prevents current flow to the detector 150 from the module malfunction detector 152. Also because of the high resistance of the resistor 170; i.e., high with respect to the resistance of the solenoid winding employed by the braking apparatus 24, there will be no substantial voltage developed at a junction 171 from the power supply 26. But when there is a malfunction such as the mentioned rupture of the solenoid winding for braking apparatus 24, the current from the power supply 26 will be diverted through the high resistance 170 and the diode 168 to turn on the SCR 165 and in turn the warning lamp 164. This same current will turn on the SCR 160 in the power supply malfunction protector 154 and render it conductive so that the output from the power supply 26 will be diverted to ground and cause the fuse 162 to rupture.

The module malfunction detector 152 is used to detect failures in two or more of the modules 11 and 11' which are associated with their respective wheels. The detector 152 includes a pair of transistors 172 and 174 arranged so that the emitter of the transistor 172 is coupled to the velocity reference capacitor 46 for the module 11 and its base coupled to the capacitor 46 for the module 11'. The transistor 174 is connected in the same way but to the opposite modules. Each of the transistors 172 and 174 have their collectors connected to the base of an output transistor 176. This output transistor 176 in turn has its emitter connected to the power supply 26 and its collector connected both to the gate of the SCR 165 and to the gate of the SCR 160. If there is a voltage unbalance between the two modules 11 and 11', and specifically their voltage reference capacitors 46, as would occur if there is a short or some other type of malfunction, there will be a difference voltage developed which will be applied to the base of the output transistor 176 so as to render it conductive. When the output transistor 176 is conductive, there will be current supplied to the SCR 165 so as to turn it on and then the warning lamp 164 to give the vehicle operator visual warning of the malfunction and also to the gate of the SCR 160. This current will turn on the SCR 160 and as before connect the output of the power supply 26 to ground. Hence the fuse 162 will be ruptured.

As will be noted, both the vehicle control malfunction detector 150 and the module malfunction detector 152 cause the fuse 162 to rupture so that the system so longer is operative. This is to insure that the vehicle operator after the visual warning by the warning lamp 164 knows that he no longer can rely upon the system to prevent either the spin or a wheel lock determined by which of the FIG. 1 or FIG. 5 systems is being employed. This feature can be varied as those versed in the art will appreciate.

From the foregoing it will be appreciated that an instantly responsive control system is provided for promptly correcting excessive rate of change of velocity conditions prior to their happening. Also, the system while being responsive to the undesired conditions is not responsive to temporary conditions such as a slowing vehicle traveling below a certain velocity prior to stopping and rough road conditions. Furthermore, the basic system is adaptable for either wheel skid or wheel spin control. Additionally the system affords the very desirable malfunction protection and warning.

What is claimed is:

1. A rate of change of velocity control system for a wheeled vehicle comprising vehicle control means controlling the velocity of a wheel of the vehicle; means responsive to the velocity of the wheel and operative to develop input signals having a time spacing corresponding to the velocity of the wheel; velocity generating means generating a series of velocity signals each having a peak signal level corresponding to the instantaneous velocity of the wheel and whereby the difference between the peak signal levels of each successive velocity signal corresponds to actual rate of change of velocity of the wheel; velocity reference generating means generating a reference signal corresponding to a certain threshold rate of change of the velocity of the wheel; control means operative in response to each of the input signals to reset the velocity generating means to a predetermined threshold level and also to reset the velocity reference generating means to the peak signal level of the velocity signal as long as the certain threshold rate of change of the velocity of the wheel is not exceeded; means comparing the velocity and reference signals and developing a predetermined output when the certain threshold rate of change of velocity is exceeded; output signal generating means operative in response to the predetermined output for rendering the vehicle control means operative to alter the velocity of the wheel so that the certain threshold rate of change of velocity is not exceeded; and means controlling the response of the system to predetermined conditions.

2. A rate of change of velocity control system as described in claim 1, wherein the responsiveness controlling means includes means restricting the response of the system to wheel velocity fluctuations of more than a certain extent.

3. A rate of change of velocity control system as described in claim 1, wherein the response controlling means includes means preventing the response of the system when the input signal is at a certain level.

4. A rate of change of velocity control system as described in claim 1, wherein the response controlling means includes means inhibiting the response of the system to wheel velocity changes of less than a predetermined magnitude.

5. A rate of change of velocity control system as described in claim 2, wherein the response controlling means further includes means preventing the response of the system when the input signal is at a certain level.

6. A rate of change of velocity control system as described in claim 3, wherein the response controlling means further includes means restricting the response of the system to wheel velocity fluctuations of more than a certain extent.

7. A rate of change of velocity control system as described in claim 6, wherein the response controlling means includes means inhibiting the response of the system to wheel velocity changes of less than a predetermined magnitude.

8. A rate of change of velocity control system as described in claim 1, further including a power source and wherein the velocity generating means includes a velocity capacitor coupled to the comparing means and also to the power source so as to be charged thereby to a voltage level corresponding to the peak signal level, means controlling the rate of charging of the velocity capacitor so that the charge is proportional to the velocity of the wheel, and discharge switch means operative when energized by the control means to discharge the velocity capacitor to a predetermined threshold level.

9. A rate of change of velocity control system as described in claim 1, wherein the velocity reference generating means includes rate of change of velocity means generating power having certain characteristics, a velocity reference capacitor coupled to the comparing means and also to the rate of change of velocity means so as to be charged thereby at a rate and to a voltage level corresponding to the certain threshold rate of change of velocity and discharge switch means operative when energized by the control means to discharge the velocity reference capacitor, and wherein the inhibiting means includes resistance means coupled to the rate of change of velocity means between the comparing means and the velocity reference capacitor so as to control the voltage level thereof.

10. A rate of change of velocity control system as described in claim 9 including a power source and wherein the velocity means includes a velocity capacitor coupled to the comparing means and also to the power source so as to be charged thereby to a voltage level corresponding to the instantaneous velocity of the wheel, means controlling the rate of charging of the velocity capacitor so that the charge is proportional to the velocity of the wheel, and discharge switch means operative when energized by the control means to discharge the velocity capacitor to the predetermined threshold level.

11. A rate of change of velocity control system as described in claim 1 further including means detecting malfunctions of the system and operative upon detecting a malfunction to disable the system.

12. A rate of change of velocity control system as described in claim 1, wherein the velocity reference generating means includes a velocity reference capacitor coupled to the comparing means so as to be charged by the output thereof and thereby develop the velocity reference signal for comparison with the velocity signal by the comparing means and means controlling the rate of discharge of the velocity reference capacitor so as to correspond to the certain threshold rate of change of velocity.

13. A rate of change of velocity control system as described in claim 12, wherein the means controlling the rate of discharge includes a resistance.

14. A rate of change of velocity control system as described in claim 12, including a power source and wherein the velocity means includes a velocity capacitor coupled to the comparing means and also to the power source so as to be charged thereby to a voltage level corresponding to the instantaneous velocity of the wheel, means controlling the rate of charging of the velocity capacitor so that the charge is proportional to the velocity of the wheel, and discharge switch means operative when energized by the control means to discharge the velocity capacitor to the predetermined threshold level.

15. A rate of change of velocity control system as described in claim 1 including tachometer means coupled to the velocity reference generating means and so calibrated as to indicate a velocity corresponding to wheel velocity.

16. A rate of change of velocity control system for a wheeled vehicle comprising vehicle control means controlling the velocity of a wheel of the vehicle; means responsive to the velocity of the wheel and operative to develop input signals having a time spacing corresponding to the velocity of the wheel; a power source; velocity generating means including a velocity capacitor having a charging path connected to the power source for charging the velocity capacitor to a peak voltage level corresponding to the instantaneous velocity of the wheel and a discharge path having discharge switch means therein operative when energized to complete the discharge path so as to discharge the velocity capacitor; velocity reference generating means including a velocity reference capacitor means charging and discharging the velocity reference capacitor so as to develop a voltage level and a voltage rate of change corresponding to a certain threshold rate of change of velocity, and discharge switch means operative when energized to discharge the velocity reference capacitor; comparison means including an operational amplifier having the inputs thereof coupled to the velocity reference capacitor and to the velocity capacitor and operative to compare the voltage levels thereof and develop a certain output when the comparison indicates the certain threshold rate of change of velocity is exceeded; control means operative in response to each of the input signals to render the means charging and discharging the velocity reference capacitor to reset the voltage level thereof at the peak voltage level of the velocity capacitor and to energize the velocity capacitor discharge switch means so as to discharge the velocity capacitor to a predetermined threshold level; and output signal generating means operative in response to the certain output for rendering the vehicle control means operative to alter the velocity of the wheel so that the certain threshold rate of change of velocity is not exceeded.

17. A rate of change of velocity control system as described in claim 16, further including means inhibiting the response of the system to wheel velocity changes, the inhibiting means having resistance means in the charging path of the velocity reference capacitor between the operational amplifier and the velocity reference capacitor for maintaining the voltage level of the velocity reference capacitor a predetermined extent below the voltage sensed by the operational amplifier so as to inhibit response of the system to wheel velocity changes of less than a predetermined magnitude.

18. A rate of change of velocity control system as described in claim 16, further including restricting means having resistance means in the discharge path of the velocity reference capacitor for controlling the rate of discharge of the velocity reference capacitor so as to restrict the response of the system to wheel velocity fluctuations of more than a certain extent.

19. A rate of change of velocity control system as described in claim 18, further including inhibiting means having resistance means in the charging path of the velocity reference capacitor between the operational amplifier and the velocity reference capacitor for maintaining the voltage level of the velocity reference capacitor a predetermined extend below the voltage sensed by the operational amplifier so as to inhibit the response of the system to wheel velocity changes of less than a predetermined magnitude.

20. A rate of change of velocity control system as described in claim 16, further including means preventing operation of the output generator means when the input signal is at a certain level.

21. A rate of change of velocity control system as described in claim 16, wherein the control means includes switch means operative in response to each of the input signals to cause the velocity capacitor discharge switch and the velocity reference discharge switch to be energized in a certain sequence for a predetermined time duration.

22. A rate of change of velocity control system as described in claim 16, wherein the comparison means includes a turn on network operative in response to the certain output to render the output generating means operative and a turn off network arranged to be enabled by the velocity reference capacitor discharge switch when energized so as to render the output generating means inoperative and arranged to be disabled by the certain output.

23. A rate of change of velocity control system as described in claim 21, further including means preventing operation of the output generating means when the input signal is at a certain level, the preventing means including one way conducting means rendered operative by the switch means to divert the output of the operational amplifier from the output generating means to prevent operation thereof.

24. A rate of change of velocity control system as described in claim 19 including means preventing operation of the output generating means when the input signal is at a certain level.

25. A rate of change of velocity control system as described in claim 24, wherein the control means includes switch means operative in response to each of the input signals to cause the velocity capacitor discharge switch to be energized in a certain sequence for a predetermined time duration and the comparison means includes a turn on network operative in response to the certain output to render the output generating means operative and a turn off network arranged to be enabled by the velocity reference capacitor discharge switch when energized so as to render the output generating means inoperative and arranged to be disabled by the certain output.

26. A rate of change of velocity control system as described in claim 25, further including means preventing operation of the output generating means when the input signal is at a certain level, the preventing means including one way conducting means rendered operative by the switch means to divert the output of the operational amplifier from the output generating means to prevent operation thereof.

27. A rate of change of velocity control system as described in claim 16, wherein the comparison means includes blocking means coupled between the operational amplifier and the discharge path of the velocity reference capacitor so as to prevent discharge of the velocity reference capacitor when the operational amplifier develops a predetermined output.

28. A rate of change of velocity control system as described in claim 21, wherein the velocity generating means includes means controlling the rate of charging of the velocity capacitor so that the charge is proportional to the velocity of the wheel.

29. A rate of change of velocity control system as described in claim 16, wherein the means charging and discharging the velocity reference capacitor includes rate of change of velocity means for charging the velocity reference capacitor and discharge switch means operative when energized to discharge the velocity reference capacitor and the control means is operative to energize the velocity reference capacitor discharge switch means to reset the voltage level of the velocity reference capacitor.

30. A rate of change of velocity control system as described in claim 16, wherein the means charging and discharging the velocity reference capacitor includes one way conducting means coupling the velocity reference capacitor to the output of the operational amplifier for charging the velocity reference capacitor and means controlling the discharge rate of the velocity reference capacitor.

31. A rate of change of velocity control system as described in claim 16, further including means detecting malfunctions of the system and operative upon detecting a malfunction to disable the system.

32. A rate of change of velocity control system as described in claim 31, wherein the detecting means includes switch means operative to disable the power source and power regulating means coupled between the power source and the switch means, the power regulating means being enabled by a predetermined output from the power source to render the switch means operative.

33. A rate of change of velocity control system as described in claim 32, wherein the detecting means further includes shunt means coupled between the power source and the vehicle control means and to the switch means, the shunt means being enabled in the event of a malfunction of the vehicle control means to render the switch means operative.

34. A rate of change of velocity control system as described in claim 31, wherein the detecting means further includes means warning of the malfunction.

35. A rate of change of velocity control system as described in claim 31, wherein the detecting means includes switch means operative to disable the power source and shunt means coupled between the power source and the vehicle control means and to the switch means, the shunt means being enabled in the event of a malfunction of the vehicle control means to render the switch means operative.

36. A rate of change of velocity control system for a wheeled vehicle comprising vehicle control means controlling the velocity of a wheel of the vehicle; a power supply for the system; a series of modules, one for each wheel, each module being coupled between the power supply and the vehicle control means and including means responsive to the velocity of the associated wheel and operative to develop input signals having a time spacing corresponding to the velocity of the wheel; associated velocity generating means generating a series of velocity signals each having a peak signal level corresponding to the instantaneous velocity of the associated wheel and whereby the difference between the peak signal levels of each successive velocity signal corresponds to the actual rate of change of velocity of the associated wheel; velocity reference generating means generating a reference signal corresponding to a certain threshold rate of change of the velocity of the associated wheel; control means operative in response to each of the input signals to reset the velocity generating means to a predetermined threshold level and also to reset the velocity reference generating means to the peak signal level of the velocity signal as long as the certain threshold rate of change of the velocity of the wheel is not exceeded; means comparing the velocity and reference signals and developing a predetermined output when the certain threshold rate of change of velocity is exceeded; and output signal generating means operative in response to the output for rendering the vehicle control means operative to alter the velocity of the wheels so that the certain threshold rate of change of velocity is not exceeded; and means detecting malfunctions of the system, the detecting means including means sensing the voltage levels of two of the velocity reference generating means and developing an output in the event of a certain difference, switch means operative in response to the output to uncouple the power supply from the system.

37. A rate of change of velocity control system as described in claim 36, wherein the detecting means further includes means warning of the malfunction.

38. A rate of change of velocity control system as described in claim 36 wherein the detecting means includes shunt means coupled between the power supply and the vehicle control means to the switch means, the shunt means being enabled in the event of a malfunction of the vehicle control means to render the switch means operative.

39. A rate of change of velocity control system as described in claim 36, wherein the detecting means includes voltage regulating means coupled between the power supply and the switch means, the voltage regulating means being enabled by a predetermined output from the power supply to render the switch means operative.

40. A rate of change of velocity control system as described in claim 39, wherein the detecting means shunt means coupled between the power supply and the vehicle control means and to the switch means, the shunt means being enabled in the event of a malfunction of the vehicle control means to render the switch means operative and means warning of the malfunction.

* * * * *

UNITED STATES PATENT OFFICE
CERTIFICATE OF CORRECTION

Patent No. 3,811,526  Dated May 21, 1974

Inventor(s) Carmeli Adahan

It is certified that error appears in the above-identified patent and that said Letters Patent are hereby corrected as shown below:

Column 2, line 19, after "frequency" delete "directed" and insert --directly--.

Column 2, line 59, after "to" insert --a--.

Column 7, line 15, after "portion" delete "1" and insert --31--.

Column 11, line 31, after "t2," delete "3" and insert --t3--.

Column 13, line 52, after "(.)" delete "as" and insert --As--.

Column 14, line 41, after "system" delete "so" and insert --no--.

Signed and sealed this 8th day of October 1974.

(SEAL)
Attest:

McCOY M. GIBSON JR.
Attesting Officer

C. MARSHALL DANN
Commissioner of Patents